No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 1.

No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 3.

No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 5.

Fig. 7.

No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 6.

No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 7.

No. 727,441. PATENTED MAY 5, 1903.
T. L. RANKIN.
APPARATUS FOR TREATING ORES.
APPLICATION FILED MAR. 4, 1903.
NO MODEL. 8 SHEETS—SHEET 8.

Fig. 12.

Witnesses
F. N. Roehrich
Ed. Russel

Inventor
Thomas L. Rankin
By his Attorney
Hubert A. Banning

No. 727,441. Patented May 5, 1903.

UNITED STATES PATENT OFFICE.

THOMAS L. RANKIN, OF SACKET HARBOR, NEW YORK.

APPARATUS FOR TREATING ORES.

SPECIFICATION forming part of Letters Patent No. 727,441, dated May 5, 1903.

Application filed March 4, 1903. Serial No. 146,103. (No model.)

*To all whom it may concern:*

Be it known that I, THOMAS L. RANKIN, a citizen of the United States, and a resident of Sacket Harbor, in the county of Jefferson and State of New York, have invented certain new and useful Improvements in Apparatus for Treating Ores, of which the following is a specification, reference being had to the accompanying drawings.

The invention relates to apparatus for treating ores by what is known as the "roasting" process; and its objects are to so construct the various parts as to avoid objections heretofore experienced, especially faults which cause undue interruption or stoppage for repairs or putting in order, and to make provision for taking advantage of such conditions as have been shown by experience to be beneficial—as, for instance, passing all of the ore through an ore-treating cylinder surrounded by a combustion-chamber, causing the draft or air passage through the cylinder to take the direction in which the ore is moving and causing the heat to act with increasing intensity as the ore progresses in the cylinder toward the furnace.

To these ends the invention consists in the construction or arrangement and combination of parts, as hereinafter more fully described and claimed.

In the drawings, Figure 1, Sheet 1, is a longitudinal side view of the apparatus, the outer shell, furnace, and foundation being partly in section and partly broken. This figure shows the sections composing the ore-treating cylinder, the carrying-wheels and connections, the end supports, the smoke-stack, and the gas-outlet pipe. Fig. 2, Sheet 1, is a side view of the feed end of the cylinder and feed and air connections.

In the drawings, 1 represents the concrete or masonry of the foundation and surrounding parts.

The grate 2 of the furnace, near the front end of the apparatus, is of a size to take the requisite amount of fuel, and the doors 3 lead thereto, the construction being such that the furnace may be fired crosswise. The combustion-flue 4 is shown as being formed by a shell made in halves, preferably of cast-iron, and bolted together. The pieces forming this shell may be about four feet in length and the lower half thereof bedded in the masonry, and in practice they are set with their ends far enough apart to allow for expansion, the spaces between such ends being closed by the asbestos covering ordinarily used. The smoke-stack 5, located at the rear end of the combustion-flue, is preferably set on the masonry. The ore-treating cylinder is rotatable and composed, ordinarily, of about five sections, each eight feet in length, making a total length of forty feet, more or less. The discharge-section 6 of the ore-treating cylinder is for the greater part of its length over the furnace, and this section is preferably smooth on its outer surface, so as not to interfere with the fuel if wood be used. The section 7, which adjoins 6, and those intervening until the smoke-stack 5 is reached are provided with ribs 8 on the outer surface, which ribs are about two and one-half inches in depth and one and one-quarter inches thick. These ribs strengthen the cylinder and cause a current of air produced by the rotation to bring down the heat from the top of the combustion-flue, so that it will circulate around the cylinder. On the section 7 is located one of the large carrying-wheels 9, and the ribs 8 of this section make connection with such wheel. The next section 10 has its ribs 8 extending from flange to flange, while the section 11, which follows, is similar to the section 7, and its carrying-wheel 12 has the main drive 13 studded thereto. The last section 14 of the series which compose the ore-treating cylinder connects with the feed for the ore, and its ribs 8 stop somewhat short of the smoke-stack 5 in order to allow a proper draft. The overhanging feed and discharge ends are not supported entirely by the main carrying-wheels 9 and 12, but have an additional support on large cast-iron mantles 15 and 16. The mantle 15 at the feed end of the ore-cylinder is anchored to the masonry on which the smoke-stack 5 is set, and the mantle 16 at the discharge end of the cylinder is anchored, as shown at 17, into the walls of the furnace. The mantles, anchors, and connections at the feed and discharge ends are similar, other than an adaptation of the mantle 16 to support the ore-receiving box and gas-exit pipe at the discharge. The mantle 16 receives the rods 18, which rest on springs 19 and support the frame 20, bearings 21, and wheels 22 beneath the overhanging end of the cylinder, thus avoiding much of the trouble experienced by the wabbling of rotatable cylinders having no such auxiliary supports at the ends. The main supports, or those which sustain the body of the ore-treating cylinder, are the large flanged wheels 23 and 24, on which the large carrying-wheels 9 and 12 rotate. The flanges of the wheels 23 and 24 are on the side toward the furnace, and the one which is nearest thereto is set an inch or two lower than the other, so that the carrying-wheel 9 will rest against the flanges of the wheels 23, and so much of the cylinder as extends to the ore-receiving box will be free to expand into that box. The portion of the cylinder which extends from the wheel 24 to the feed end will have greater expansion and be free to move the carrying-wheel 12 away from the flanges of the wheels 24.

Figure 9:
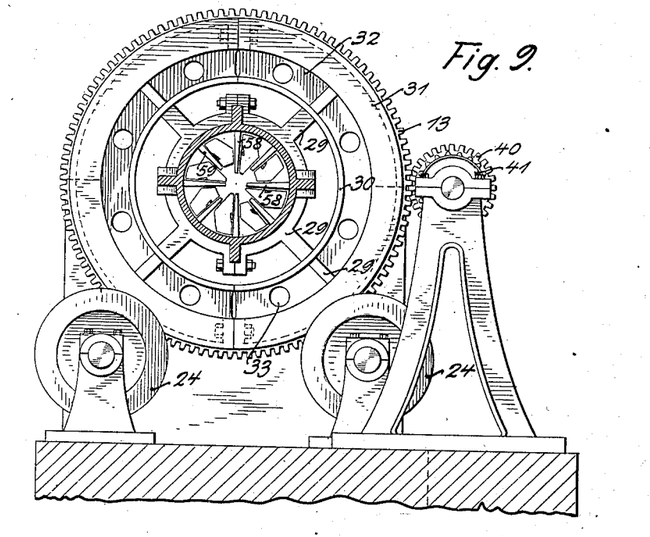
Fig. 9, Sheet 6, is a cross-section of the ore-treating cylinder on the line *r r* of Fig. 7, showing by a face view looking rearward the same parts and the openings in the web of the drive-wheel for the passage of combustion gases.
Figure 10:
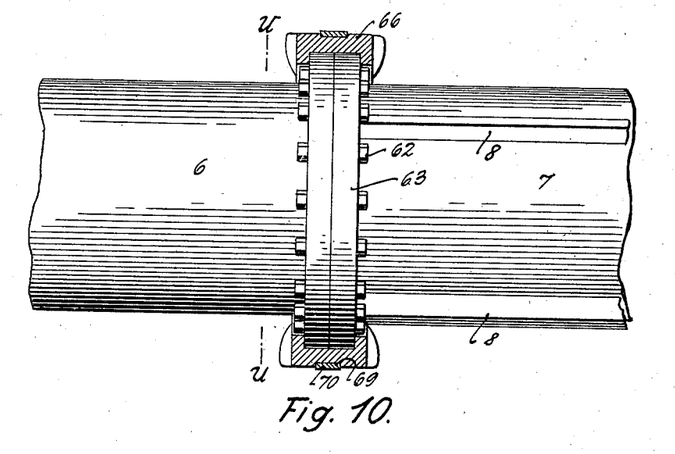
Fig. 10, Sheet 7, shows parts of two of the sections united at their adjoining ends by flanges and bolts and also one half of the reinforcing rim and band in depression.
Figure 11:
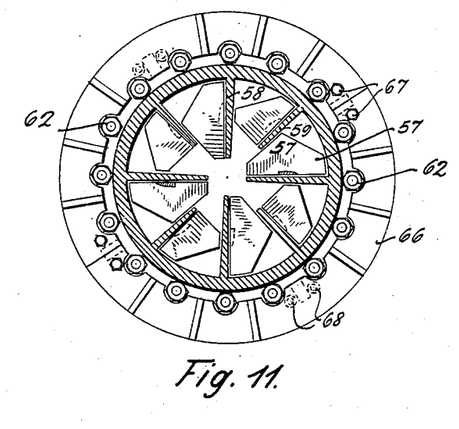
Fig. 11, Sheet 7, is a cross-section through the ore-treating cylinder on the line *u u* of Fig. 10 and shows by a front view the flange and bolts and both halves of the reinforcing-rim studded on the flange to make a more perfect joint.
Figure 12:
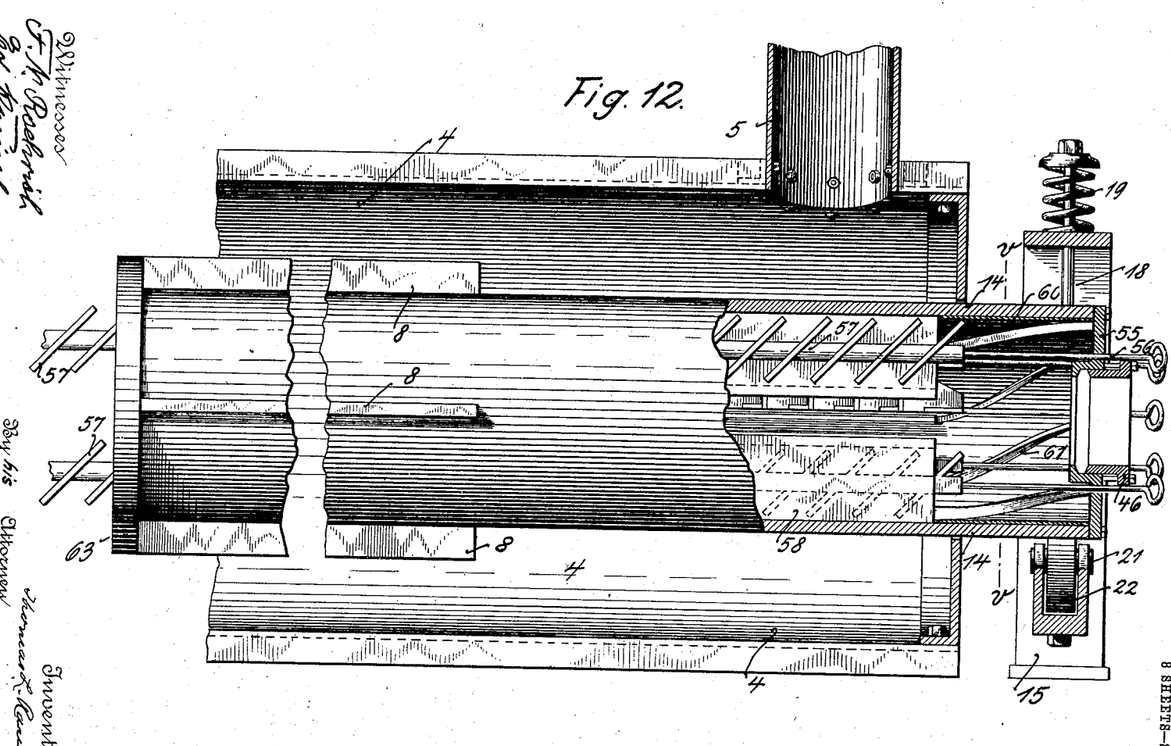
Fig. 12, Sheet 8, is a view of the rear end section of the ore-treating cylinder and surrounding shell, partly broken and partly in section, and shows the smoke-stack, combustion-flue, interior wings, and movable rabbles, the rear mantle, supporting-wheels and springs, also the rods for shifting the rabbles, a loose ring in the end of the cylinder, and the stuffing-box connection for the feed and air pipes.
Figure 13:
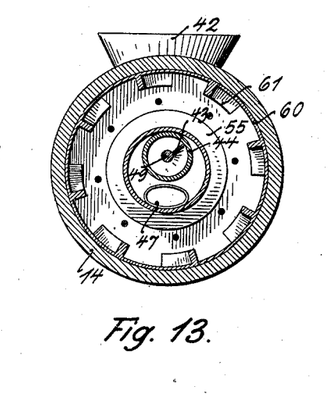
Fig. 13, Sheet 7, is a section through the ore-treating cylinder on the line *v v* of Fig. 12 and shows the feed-hopper, the rear end or head of the cylinder, the interior spirally-flanged ring, the pipe for receiving the screw-conveyer pipe, and air-inlet, which are shown therein.

The carrying-wheels 9 and 12 are similar in construction, being heavy wheels cast whole and prepared for being broken between their bolting-flanges 25, so as to form halves that can readily be placed around the ore-cylinder and bolted together when the apparatus is being set up. The inner periphery of the web of the wheels 9 and 12 form a band 26, which has notches 27 cast midway on the two halves, which notches receive lugs 28, cast on ribs 8 on the exterior of the cylinder. When the wheels 9 and 12 are bolted in place on the cylinder, they require no keys or fastening devices to secure them. From the band 26 large spokes 29 extend out through a band 30 to the rim 31 of the wheel, and between the spokes 29 and attached to the band 30 is a heavy web 32, in which are large holes 33. On each side of the wheel a funnel-shaped shield 34 is studded, which shield extends around the wheel and has projecting collars or flanges 35 extending into the combustion-flue. The main draft will pass between the bands 26 and 30, while a part of the heat and draft will pass above the band 30 and through the holes 33, thus heating the wheels 9 and 12 to the outer edge, which will avoid breakage by expansion. The drive connections are made on the carrying-wheel 12 and are formed by a cog-wheel 36, having a rim 37 and an annular inside flange 38, wide enough for securing to the wheel 12 by studs 39. (Best seen in Fig. 9, Sheet 6.) The cog-wheel 36 is cast whole and slipped over the section of the cylinder and then studded to the shield 34 and carrying-wheel 12. The pinion 40 connects with a source of power through the sprocket 41 and by its connection with the cog-wheel 36 imparts motion thereto and rotates the ore-treating cylinder.

Figures 1, 2:
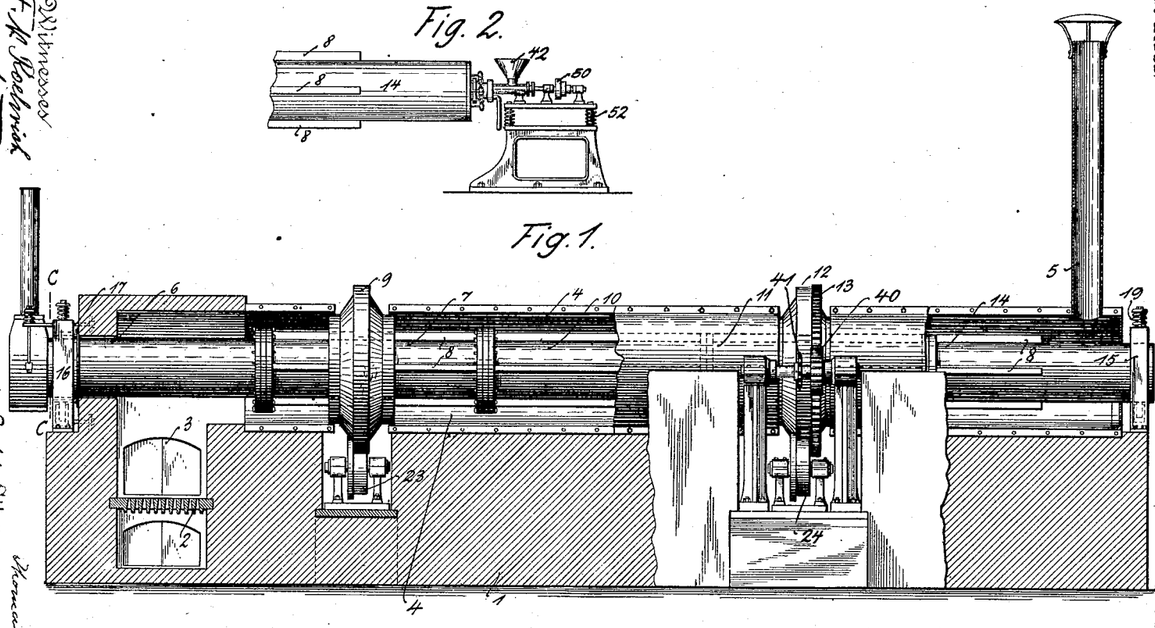
Figure 3:
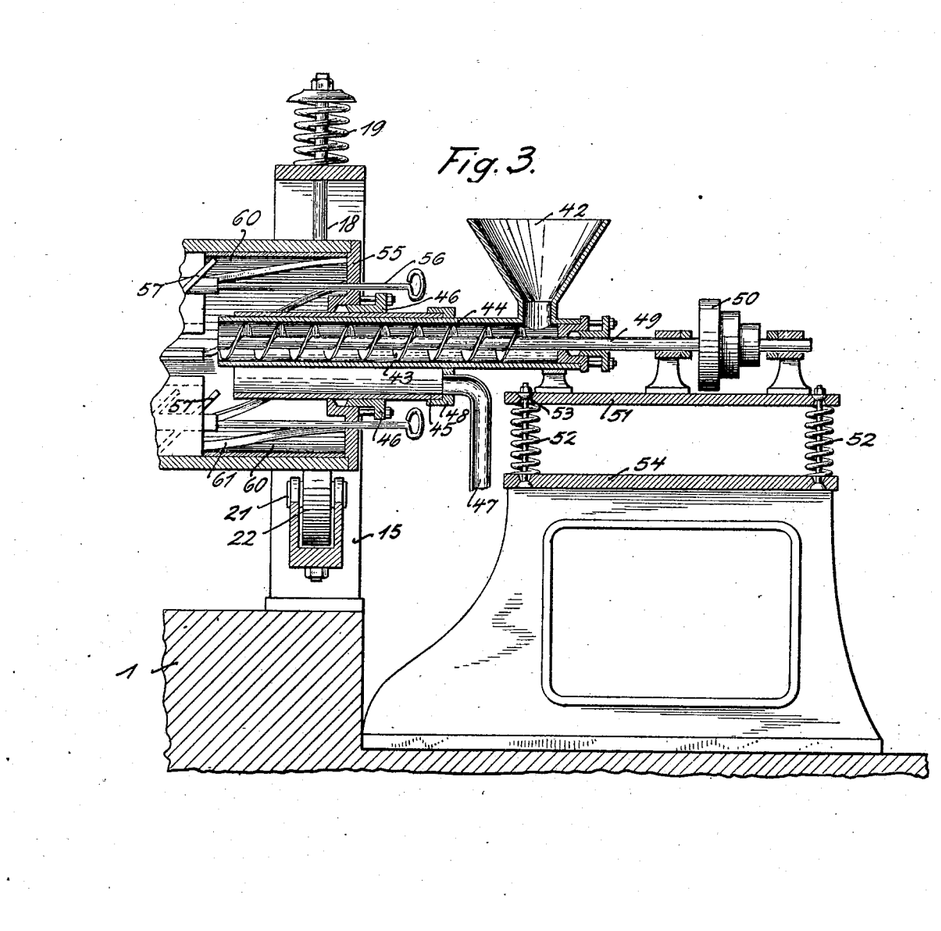
Fig. 3, Sheet 2, is an enlarged longitudinal sectional view of the rear part of the ore-treating cylinder and feed and air connections.
Figure 4:
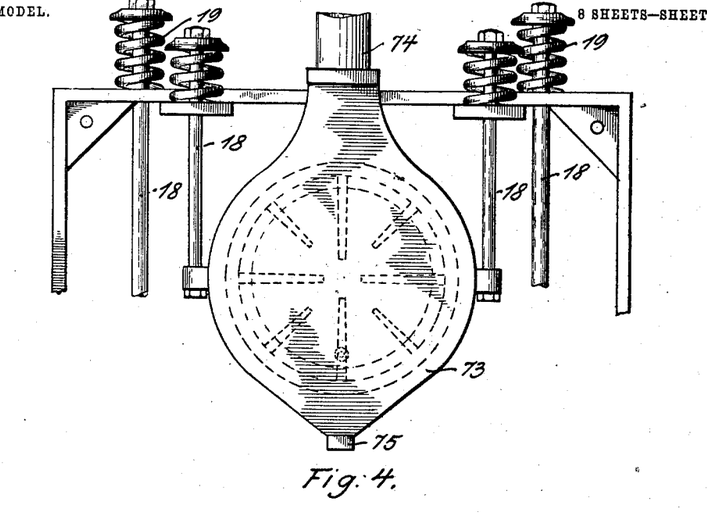
Fig. 4, Sheet 3, is a front view of the discharge end of the ore-treating cylinder, ore-box, gas-outlet, and also shows a portion of the mantle and spring connections for supporting the overhanging front end of the cylinder.
Figure 5:
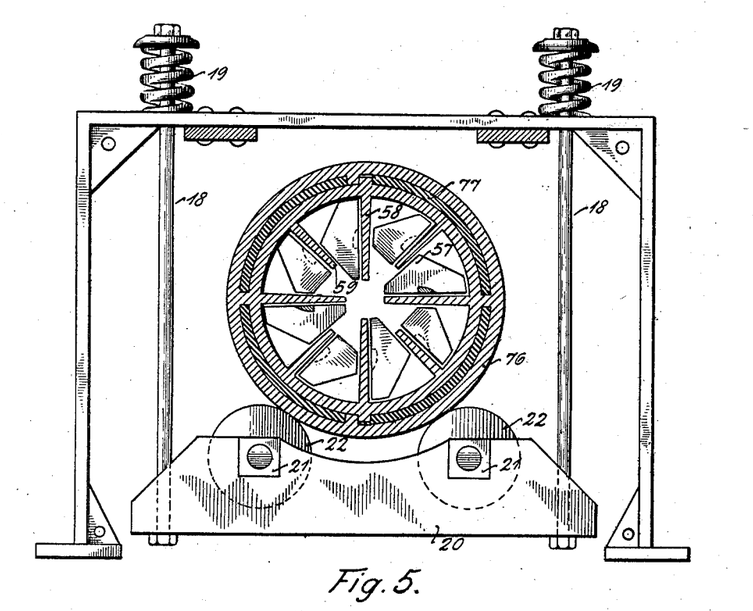
Fig. 5, Sheet 3, is a section taken through the line *c c* of Fig. 1, showing the front end of the cylinder, mantle, supporting-wheels, interior wings and rabbles, and an interposed asbestos packing.
Figure 6:
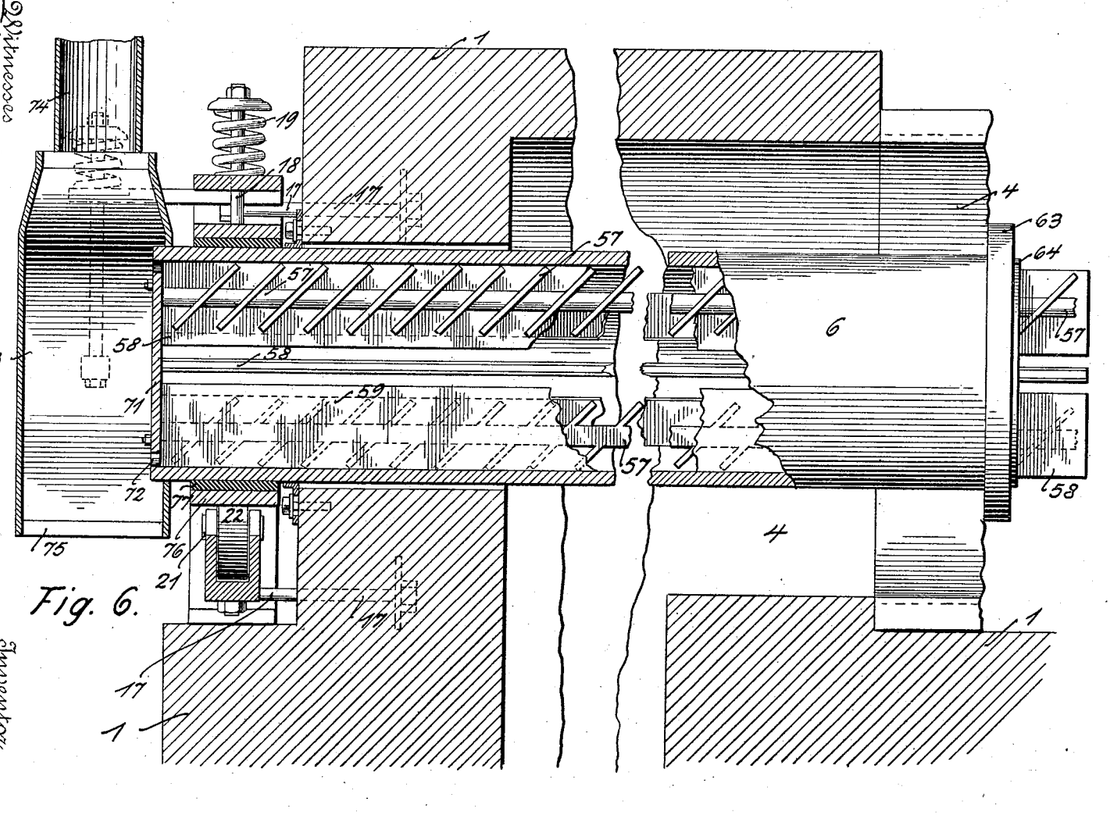
Fig. 6, sheet 4, is a side view, partly in section and partly broken, of the first section of the ore-treating cylinder and surrounding combustion flue or shell and also shows in section the mantle, springs, and supporting-wheels at the discharge end, the ore-receiving box, and movable rabbles in the ore-cylinder.
Figure 7:
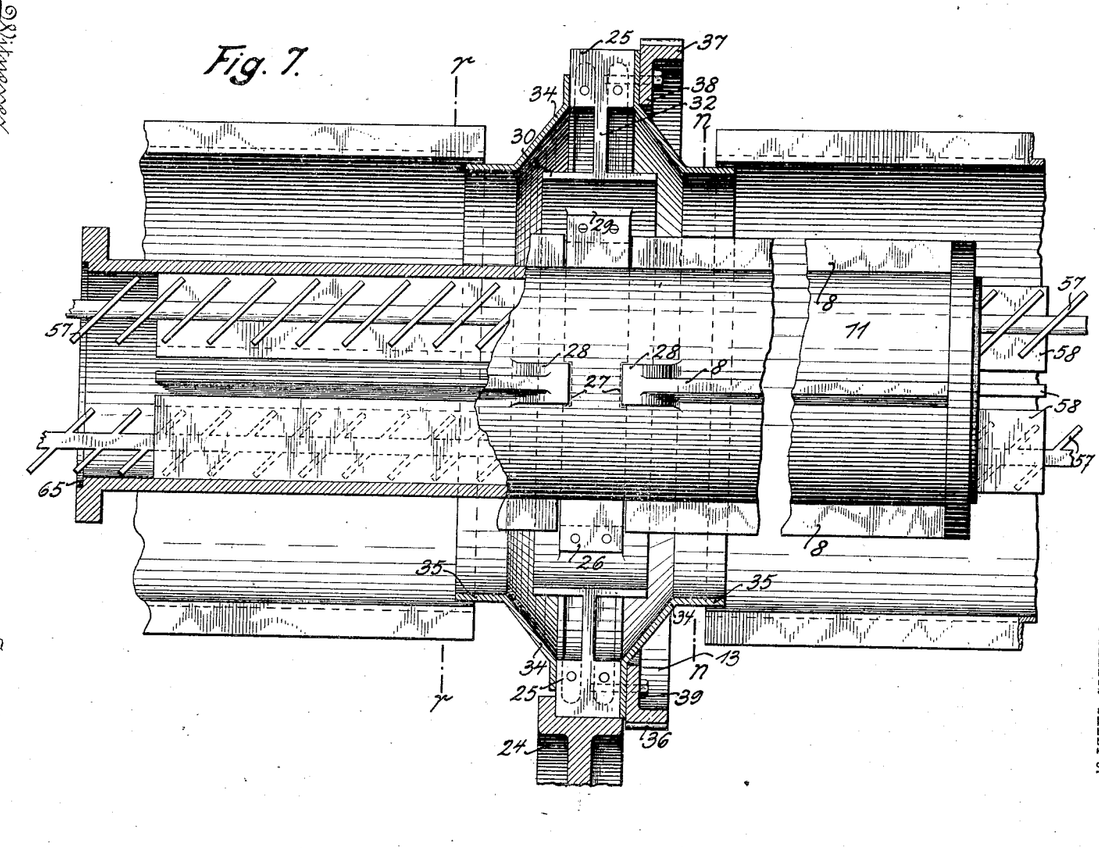
Fig. 7, Sheet 5, is a side view, partly in section, of one of the intermediate sections of the ore-treating cylinder, surrounding shell, and one of the carrying-wheels to which the drive-wheel is studded. It also shows the flange at one end for uniting with the preceding section and the extending wings which pass into the succeeding section, as well as the flange for making the joint.
Figure 8:
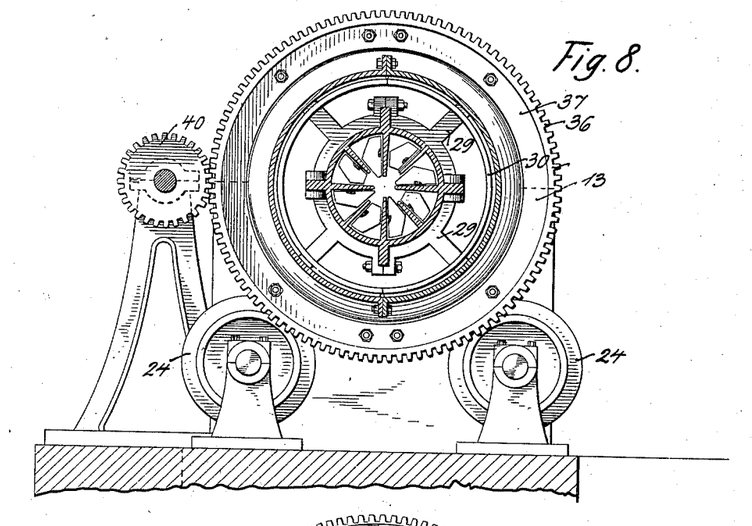
Fig. 8, Sheet 6, is a cross-section of the ore-treating cylinder, taken on the line *n n* of Fig. 7, and shows an end view looking forward of the carrying-wheels, drive-wheel, pinion, sprocket-and-gear connections.

The feed end of the ore-cylinder is supported by the mantle 15 and its connections already described, and the feed takes place by introducing the ore into the hopper 42, which leads it to the screw conveyer 43. This screw conveyer is contained in a pipe 44, which enters a larger pipe 45, connecting with the interior of the cylinder by a suitable stuffing-box 46. The pipe 44, containing the screw conveyer, projects into the cylinder about three inches beyond the end of the pipe 45, so as to allow for expansion of the cylinder, and is located near the top of such pipe, so as to leave room for an air-inlet pipe 47, which enters the pipe 45 below the conveyer-pipe 44. The air-inlet pipe 47 terminates just inside of the head 48, through which the pipe 44 also enters the pipe 45, and the air may be introduced under pressure, the arrangement being such as to permit the air to circulate freely through all parts of the ore-treating cylinder and come in contact with the ore under treatment. The feed-screw or conveyer 43 receives its motion through connections with its shaft 49 and pulleys 50, and the hopper, feed-pipe, screw-shaft, and pulleys are supported at their outer end by the base-plates 51, which rest on springs 52, having half ball-bearings on the rods 53, passing through the plates 51, all of which parts are supported by a suitable casting or foundation 54. These connections for supporting the outer end of the feed-pipe, &c., are designed to counteract the lateral and vertical motion of the end of the cylinder, which is itself supported by the mantle and connections already described. The head 55 at the feed end of the cylinder is suitably fitted and studded onto such end and may be provided with holes for the passage of rods 56, connecting with movable rabbles 57, placed between the inwardly-extending wings 58 and 59, which form ore-treating plates inside of the cylinder. The rods 56 are intended to be used or not, as desired, for shifting the position of the rabbles 57 endwise. The rabbles 57 set flat on the lifting side of the treating-plates 58 and 59 when such plates reach a horizontal position, as seen in Fig. 5, Sheet 3. These rabbles slide when going over the top of the cylinder and are allowed sufficient play to tumble and have an angular form, which adapts them to the spaces between the longer wings or plates 58 and the shorter wings or plates 59. The rabbles 57 are formed so as to incline or angle toward the discharge end of the furnace, and they may be set on their connecting-bars at any desired angle which will enable them to move the ore through the cylinder in the time required for treatment—say from fifteen to fifty minutes, the latter time usually being sufficient to treat any refractory ore. The rabbles 57 are made narrower as they approach the periphery of the cylinder, so that the ore in falling from the treating-plates above may pass over this part of the rabbles and gain a forward movement to whatever point the rabbles are inclined, and this narrowing of the rabbles permits free air circulation at the periphery of the cylinder between the treating-plates. The rabbles may all extend twelve or fifteen feet within the cylinder, at which point the ore will be thoroughly dried and prevented from packing, and two sets of rabbles may extend the entire length of the cylinder, as shown. Inside of the feed-end head 55 of the cylinder is a loose short shell 60, having small spiral flanges 61, and this shell when slipped into the end of the cylinder is sufficiently tight to remain in position and rotate with the cylinder. The spiral flanges 61 on the interior of the shell 60 serve the purpose of conveying any dust or ore that may accumulate around the feed-pipe 44 onto the rabbles and treating-plates, which will pass it forward in the cylinder. The longer treating-plates or wings 58 and the shorter ones 59, which form alternating series within the cylinder, are cast heavier where they connect with the periphery of the cylinder than at their inner termini. The longer plates 58 extend nearer to the center, but leave space at the center and between their termini, and the shorter plates 59 extend inwardly far enough to leave about the same space between their termini and the longer plates that there is between the longer plates at their termini. This arrangement allows the ingress and egress of ore and air to be about equal in all parts of the cylinder. The treating-plates 58 and 59 extend at one end of each section, so as to overlap the joint made with the next section of the cylinder and join ends with the wings in such adjoining section, the parts being turned off on the outer edge and calipered to fit closely in the connecting end of the adjoining section, which is also turned to receive them. This projection of the treating-plates from one section into another to meet the plates of such section gives greater rigidity to the joint and relieves the strain on the bolts 62, which pass through the flanges 63. The adjoining ends of the sections are also united by a male end 64, which fits into a corresponding depression 65, of about one-half inch, made in the next section. The joint between the sections composing the ore-cylinder are also reinforced by a cast-iron clamp 66, which is fitted closely over the flanges 63. The clamps for the joints are made in halves, which are studded on one side at the middle by studs 67 and at each end on the opposite side by studs 68, so that there may be no drawing in opposite directions when expansion takes place. The clamps 66 have an annular depression 69 running around them, and a wrought-iron band 70 rests in this depression. The band 70 has tapering overlapping ends, which may be studded to the clamp. The clamp 66 and band 70 form a strong support for the joint, which relieves the strain on the bolts 62 through the flanges 63. The clamps being on the outside of the cylinder and nearer the heat passing through the combustion-flue, they will of course expand as much as the flanges to which they are studded.

The discharge end of the ore-treating cylinder is partly closed by a baffling-head 71, which is smaller than the cylinder, so as to leave an annular space or opening 72 of about one and one-half inches, through which the gases escape into the ore-box 73 and from thence to the gas-escape pipe 74, while the ore falls down through the same opening and passes out through the discharge 75. The discharge end of the cylinder fits loosely in the ore-box and may expand therein. The discharge end of the cylinder is provided with a non-conducting band 76, which has projections or lugs about one inch in depth to hold it from the cylinder, and the space between this band and the cylinder is filled with asbestos packing 77, so that the heat will not act unduly on the wheels 22, which support this end of the cylinder, as before described.

It is obvious that changes in details may be made in some or all of the parts thus described without changing their character or functions, and consequently come within the purview and scope of the invention as above set forth.

Having thus described my invention, what I claim as new, and desire to secure by Letters Patent, is—

1. In ore-roasting apparatus, a rotatable cylinder provided with ore-treating surfaces formed by two series of long and short inwardly-extending wings, the wings of the shorter series being made to alternate with those of the longer series, and to terminate far enough from the center of the cylinder to leave spaces between them and the adjacent longer wings, about equal to the spaces between the inner termini of the longer wings, substantially as described.

2. In ore-roasting apparatus, a rotatable cylinder provided with inwardly-extending wings forming ore-treating surfaces, in combination with loose rabbles in the spaces between such wings, said rabbles being inclined to move the ore forward, and also adapted to tumble and slide, as the cylinder rotates, from the surface of one wing to that of another, whereby the ore may be moved through the cylinder, brought in contact with the treating-surfaces and agitated to prevent packing and allow circulation of air through the ore under treatment, substantially as described.

3. In ore-roasting apparatus, a rotatable cylinder provided with inwardly-extending wings forming ore-treating surfaces, in combination with means for moving the ore forward in said cylinder, means for feeding the ore through a pipe to the cylinder, a loose shell in the feed end of the cylinder, said shell being adapted to rotate therewith, and provided on its interior with spirals for moving such ore and dust as may accumulate around the feed-pipe into the cylinder, substantially as described.

4. In ore-roasting apparatus, a rotatable cylinder provided with inwardly-extending wings forming ore-treating surfaces, in combination with means for moving the ore forward in said cylinder and means for feeding the ore thereto, the feed comprising a short pipe and stuffing-box connections at the end of the cylinder, a feed-pipe and screw conveyer therein and passed through the same so as to project beyond the inner end of said short pipe, an air-inlet pipe entering said short pipe and a hopper leading to said screw conveyer, substantially as described.

5. In ore-roasting apparatus, a rotatable cylinder provided with ore-treating surfaces, in combination with means for feeding the ore thereto, comprising a hopper, feed-pipe and screw conveyer entering one end of said cylinder, and shaft-and-pulley connections for rotating, said conveyer, the same being supported on springs and half ball-bearings, whereby said feed mechanism may remain unaffected by the jarring of said cylinder, substantially as described.

6. In ore-roasting apparatus, a rotatable cylinder provided with inwardly-extending wings forming ore-treating surfaces, in combination with means for feeding the ore thereto at one end, means for moving the ore through said cylinder, a baffling-plate at the discharge end of said cylinder, such plate being smaller in diameter than the cylinder and arranged to leave an annular space for the exit of the ore and gases, and means for conducting the gases in one direction and the ore in another, substantially as described.

7. In ore-roasting apparatus, a rotatable cylinder having ore-treating surfaces therein, in combination with means for feeding the ore to said cylinder, means for moving the ore through the cylinder, means for supporting the discharge end thereof, and a heat-non-conducting band at said discharge end, substantially as described.

8. In ore-roasting apparatus, a rotatable cylinder composed of sections united together, the connecting ends of the adjoining sections being flanged and bolted, in combination with a reinforcing-clamp made in halves, and studded to the flanges at the middle of said halves on one side and at the ends of the halves on the opposite side of the flanges, the halves of said clamp being provided with a depression, and, a band placed therein, said band being overlapped at its ends and studded to said clamp, substantially as described.

9. In ore-roasting apparatus, a rotatable cylinder provided with inwardly-extending wings forming ore-treating surfaces, said cylinder being composed of sections united together, the wings of one section being fitted and projected into the end of the adjoining section for giving rigidity to the joint by which said sections are united, substantially as described.

10. In ore-roasting apparatus, a rotatable cylinder provided with inwardly-extending wings forming ore-treating surfaces, said cylinder being composed of sections having flanged ends bolted together, the wings of one section being fitted and projected into the end of the adjoining section, in combination with a reinforcing-band studded to the flanges forming the joint, substantially as described.

11. In ore-roasting apparatus a furnace and combustion-flue, a rotatable cylinder therein, through which the ore is passed for treatment, said cylinder being provided with exterior ribs, a carrying-wheel formed in halves bolted together and fitted to said cylinder, in combination with lugs on the ribs of the cylinder, depressions on the carrying-wheel fitting said lugs, the outer rim of said wheel being provided with an annular shield having flanges projecting into the combustion-chamber, and holes in the web of said carrying-wheel for allowing the gases to pass through and come in contact with the outer rim of said wheel, substantially as described.

12. In ore-roasting apparatus, a furnace and combustion-flue, a rotatable cylinder therein, said cylinder being provided with exterior ribs having lugs thereon, in combination with one or more carrying-wheels having an inner band fitted to the exterior of said cylinder, spokes from said inner band to an outer band, and a web and spokes connected with an outer rim, the inner band being provided with depressions adapted to receive the lugs on the ribs of said cylinder, and the outer rim of said wheel being provided with an annular shield having a flange or collar projecting into the combustion-chamber, and arranged to permit gases in the combustion-chamber to pass through holes in the web, and come in contact with the outer rim of said wheel, substantially as described.

13. In ore-roasting apparatus, a rotatable cylinder in combination with carrying-wheels supporting the main body thereof, the ends of said cylinder being supported by mantles having spring connections and tension for sustaining the same and permitting rotation thereof, substantially as described.

THOMAS L. RANKIN.

Witnesses:
ARTHUR C. MANDEL,
EDWARD M. BLIVEN.